Jan. 14, 1964 J. G. BLACK, JR., ETAL 3,117,364
APPARATUS FOR MANUFACTURE OF CAPACITORS
Filed April 13, 1961 7 Sheets-Sheet 1

INVENTORS.
Charles C. Rayburn
James G. Black, Jr.
BY
ATT'Y.

Jan. 14, 1964     J. G. BLACK, JR., ETAL     3,117,364
APPARATUS FOR MANUFACTURE OF CAPACITORS
Filed April 13, 1961     7 Sheets-Sheet 2
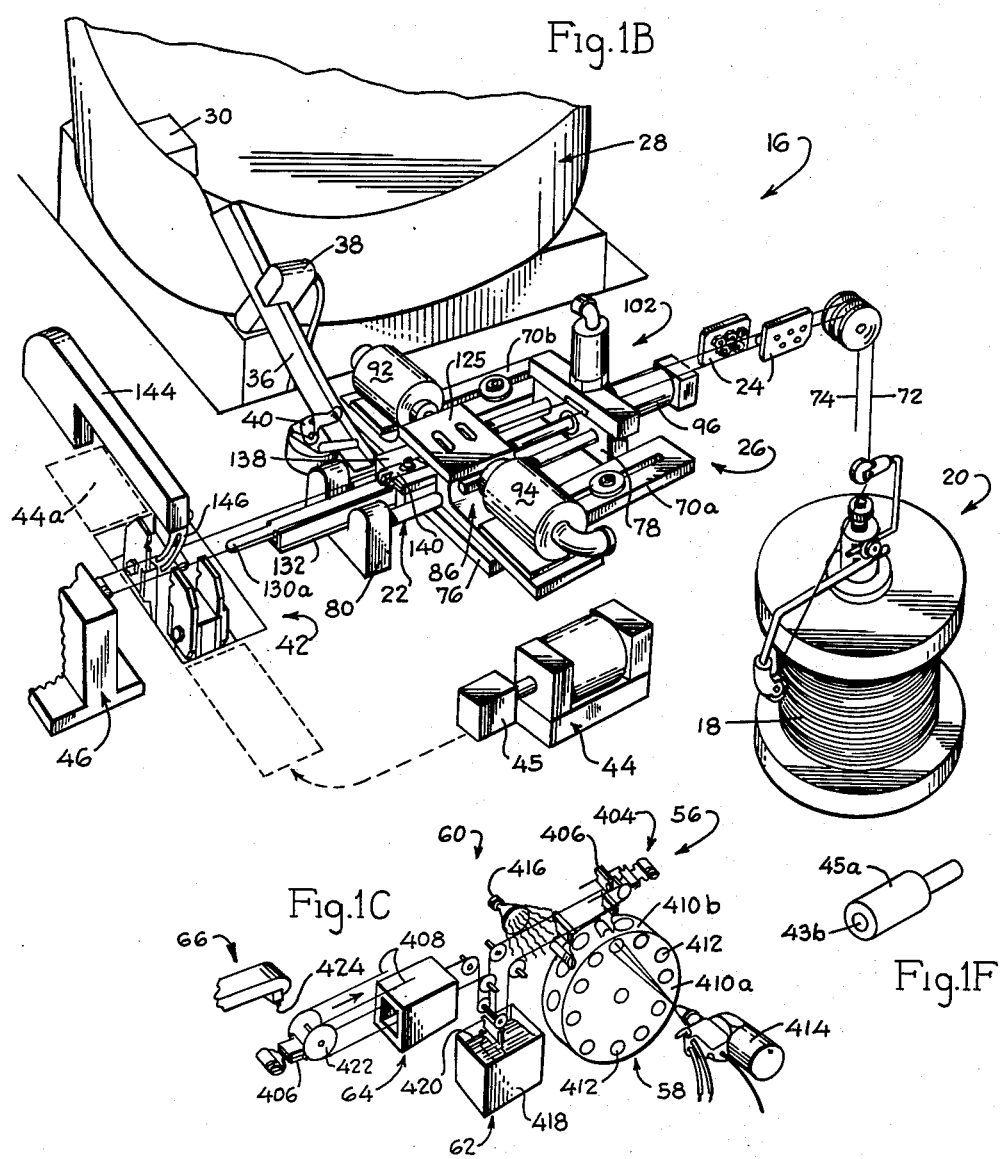
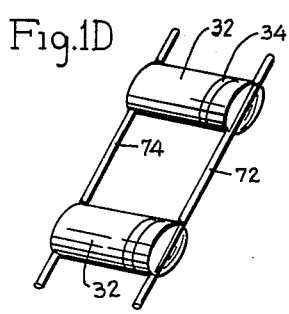
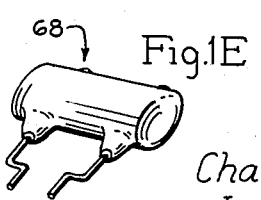
INVENTORS.
Charles C. Rayburn
James G. Black, Jr.
BY
ATT'Y.

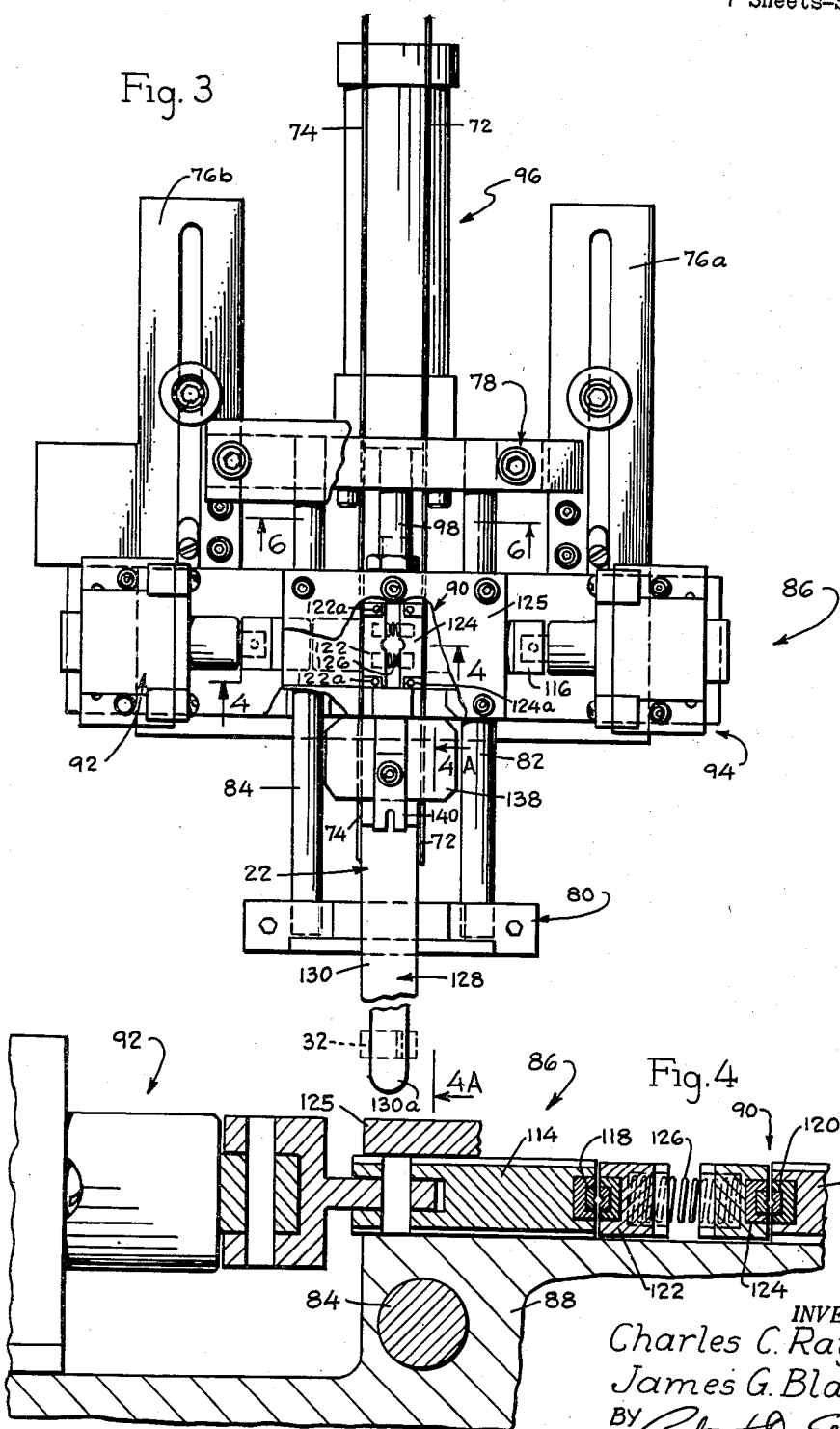

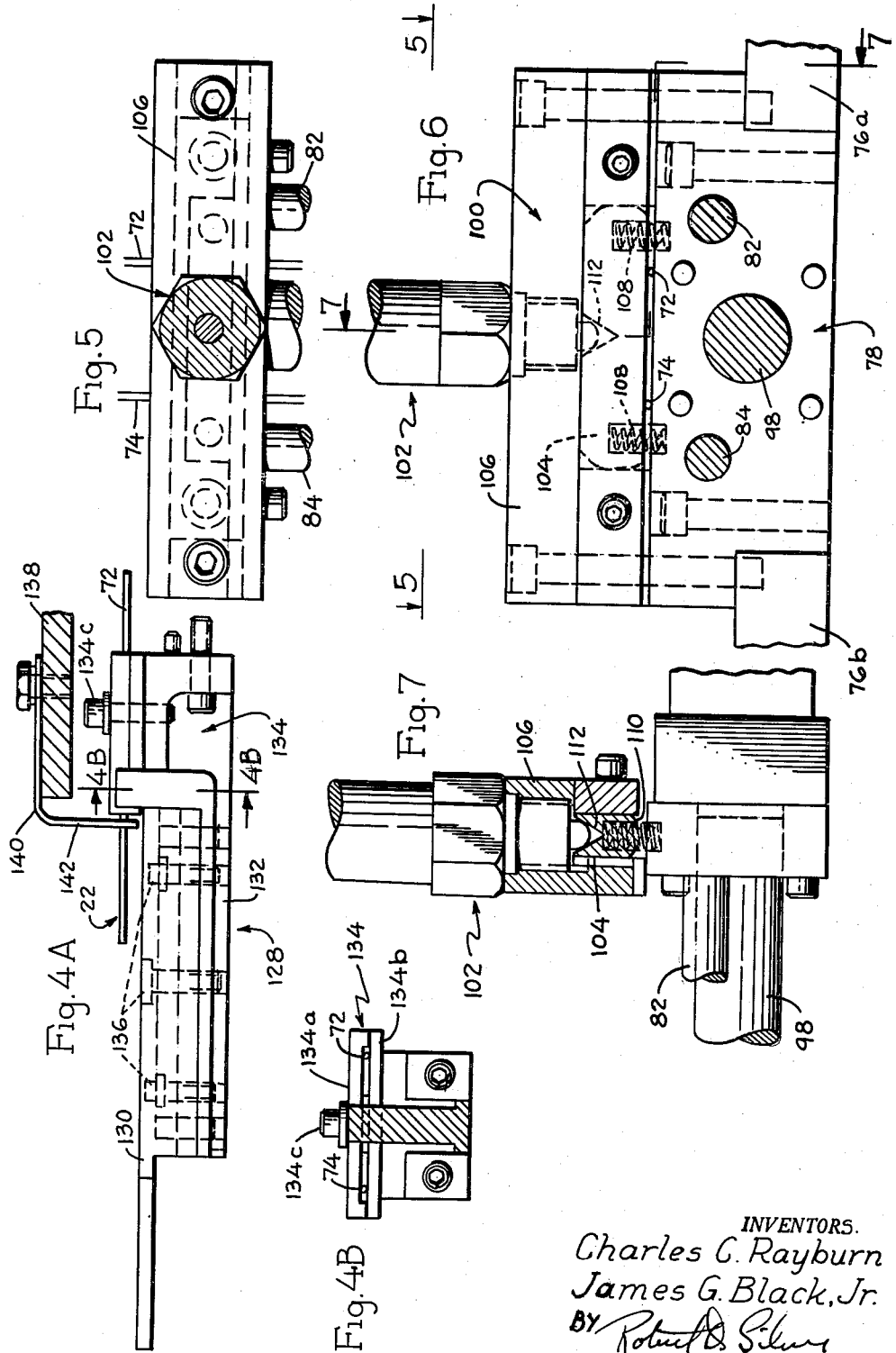

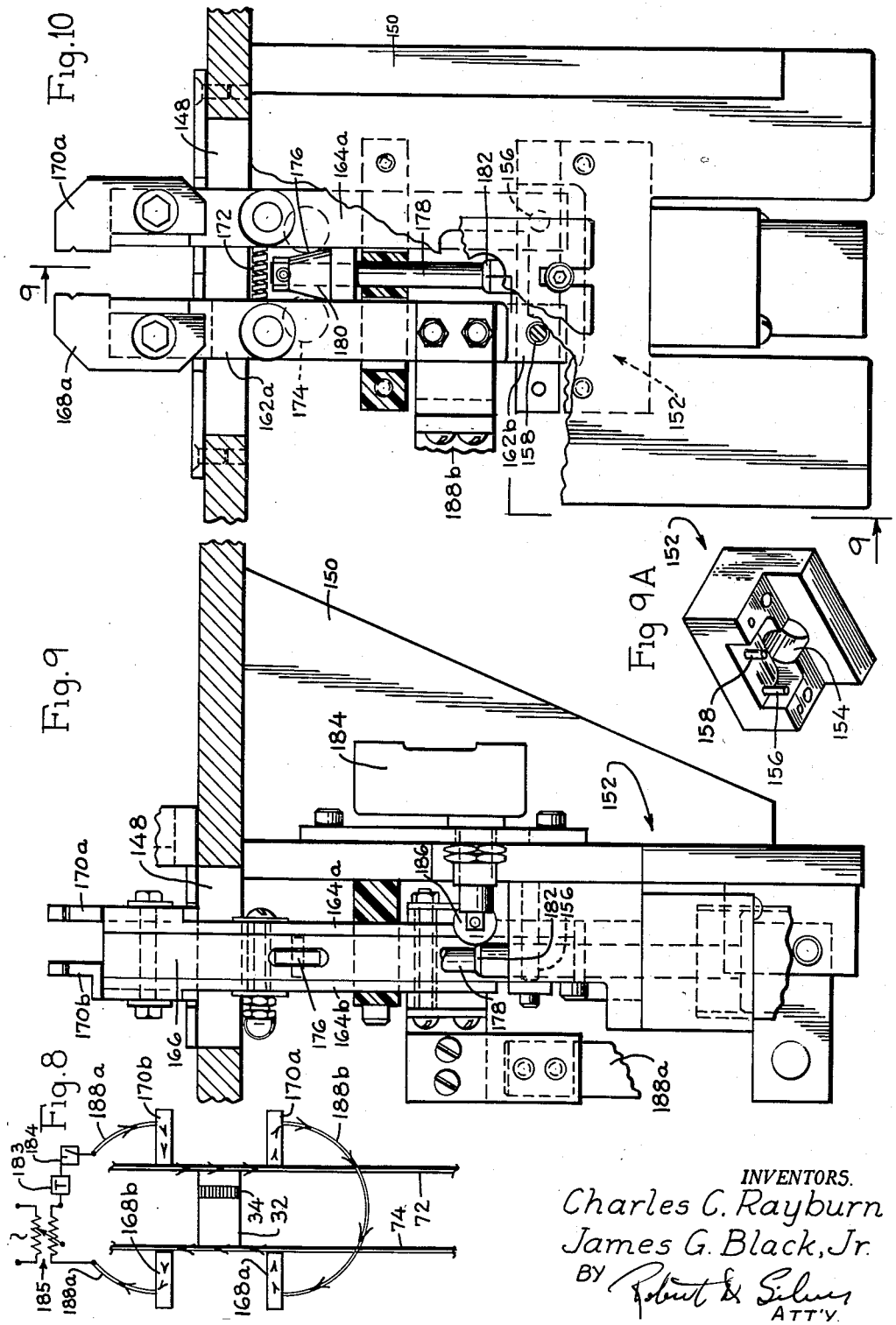

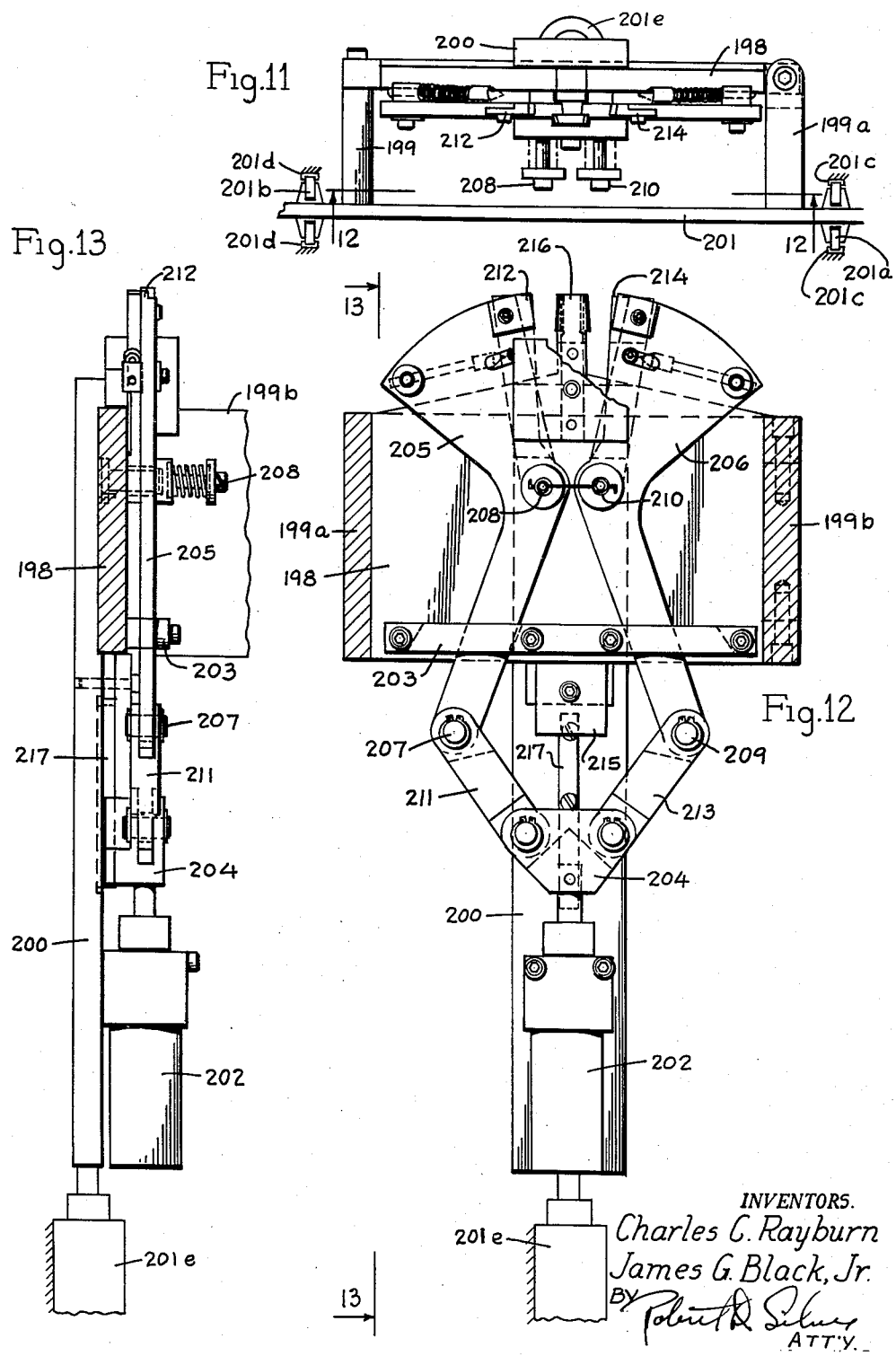

Jan. 14, 1964     J. G. BLACK, JR., ETAL     3,117,364
APPARATUS FOR MANUFACTURE OF CAPACITORS
Filed April 13, 1961     7 Sheets-Sheet 7

INVENTORS.
Charles C. Rayburn
James G. Black, Jr.
BY
ATT'Y.

3,117,364
Patented Jan. 14, 1964

3,117,364
APPARATUS FOR MANUFACTURE OF
CAPACITORS
James G. Black, Jr., Springfield, and Charles C. Rayburn, Falls Church, Va., assignors to Illinois Tool Works Inc., a corporation of Delaware
Filed Apr. 13, 1961, Ser. No. 102,753
23 Claims. (Cl. 29—25.42)

This invention relates in general to an apparatus for assembling electrical components and more particularly relates to an apparatus for assembling lead wires to convolutely wound foil type capacitors.

In the copending application of Charles C. Rayburn filed August 20, 1958, Serial No. 756,121, and assigned to the same assignee, now Patent No. 3,040,415, the inventor being one of the joint inventors of the instant application, there is disclosed a novel form of wound capacitor as well as the method of making same. This instant invention relates to a method and apparatus for automatically making such a capacitor as well as certain other types of capacitors.

Wound capacitors are normally fabricated from strips or tapes of conductive material, such as a metal or a conductively coated dielectric, wound into a tight coil. In winding the capacitor coil or body, two or more conductive tapes are wound together with dielectric material positioned between the conductive tapes to insulate them from each other. In forming the conventional capacitor coil or blank, the conductive tapes are staggered so that the edge of one tape extends beyond one edge of the dielectric layer, while the opposite edge of the second tape extends beyond the second margin of the insulating layer. Thus, normally in winding the capacitor coil, two conductive tapes are wound in staggered arrangement with the intermediate dielectric material positioned only between the overlapping portions of the two conductive tapes. The wound capacitor coil thus has the opposed extending edges of the pair of conductive tapes forming the two ends of the coil. It is then common practice to secure a lead wire to each end of the coil formed by the conductive tapes by soldering.

Wound capacitors, using plastic or paper dielectric materials, are presently used in quantity by industry. However, such capacitor constructions have certain inherent disadvantages, especially if the conductive tapes are made of a thin tin foil. Such foil has little inherent mechanical strength. When the leads are soldered to the edges of such coil tapes, constant care must be exercised to prevent tearing away the leads from the capacitor. Attempts have been made to use aluminum foil in place of tin foil, and such presents the difficulty of soldering lead wire to aluminum. Still another form of capacitor of this construction uses conductive tapes formed from plastic sheet having a metalized coating on one side. Again, problems exist when an attempt is made to connect the lead wires to the edges of the metallized plastic tapes. Providing a good electrical contact between the lead wires and the metalized coating of the tape, and contemporaneously providing a sufficiently strong physical bond between the lead and the capacitor ends is difficult. In the already referred to pending application of Rayburn there are disclosed wound capacitors which are fabricated from convolutely wound tapes of conductive foil and plastic dielectric tapes and from metalized or coated plastic tapes. In fabricating the first form in accordance with this invention, the foil tapes are separated from each other in overlapping position by a dielectric plastic tape which is wider than that used by others and extends beyond the edges of the foil. In attaching the leads to such a capacitor body, heat is applied to each of the leads to sufficiently high temperature so that when they are placed against opposite ends of the capacitor coil they will melt the extending edges of the plastic tape. The plastic of the tape will flow away and round the heated lead and permit it to be forced into an embedded position in the plastic foil and intimate contact with the edge of the metal foil tape in that area. Upon cooling, the melted plastic will normally fuse into a solid portion locking the lead within the edge of the capacitor coil and in contact with the edge of the metal foil. The same technique is applicable to a capacitor wound from metalized plastic tapes. In this type of capacitor, the heated lead wire will melt the plastic body of the metalized tape and accomplish the mounting of the lead into and onto each of the ends of the capacitor coil. The melted, then solidified plastic material fuses around each of the leads to lock the lead within the end of the capacitor coil. There is normally sufficient of the deposited metalized material within the fused portion of the plastic to provide good conductivity between the lead and the conductive strips of the capacitor.

The instant invention is well adapted to assemble in an automatic fashion the following four types (a-d) of convolutely wound capacitor blanks, which utilize thermoplastic dielectric tapes: (a) the so-called conventional extended foil type of capacitor blank which utilizes tin or other low melting point metals as the electrode foils and wherein the foil extends beyond the side margins of the thermoplastic tapes which form the dielectric. These capacitor blanks are generaly of the conventional non-inductive wound type. For certain applications, which will be later explained, the leads may be tamped into place by special mechanism to be described to obtain the requisite bonding strength of the lead wires to the foil as well as to precisely dimension the size of the capacitor body in critical dimensional tolerance applications. While the length of the cylindrical capacitor blanks for this type of capacitor normally vary from one quarter of an inch to one inch, depending on the application, the techniques and apparatus herein described may be used for almost any size of capacitor blank. The leads on the final capacitor, depending on the particular application, may be long and straight, short, short and crimped, crimped and swaged, or swaged. Some of the desired configurations of the final capacitor are shown in the copending applications of Charles C. Rayburn, filed on July 26, 1960, and having Serial No. 45,323, now Patent No. 3,056,939, and Serial No. 45,421 (b) and (c). The second and third types of capacitors adapted to be assembled by the instant apparatus are the aforediscussed extended film and metalized film capacitors shown in the first mentioned application of Rayburn. The leads for these types of capacitors and the length or body styles are of the same general nature as those in the extended foil types in (a) above. (d) The fourth type of capacitor adapted to be handled by the instant apparatus and method is the so-called "sheared ends" type of capacitor blank. In this type of capacitor a low melting point type foil, such as tin, is cut flush with the ends of the plastic film and is also made in a variety of body and lead styles as previously discussed relative to (a) above. This type of capacitor is particularly used in miniature sizes.

The present apparatus will automatically assemble any of the type of capacitor blanks (a) through (d), discussed previously, to lead wires, preform and cut the lead wires to desired configuration and length, load the capacitors into mechanism for automatically applying a protective coating thereto and deliver the capacitors ready for packaging. The apparatus and method may be varied to suit the requirements of the particular capacitor end products desired.

Therefore, a general object of this invention is to provide a method and apparatus for automatically securing terminal wires to a variety of types of rolled capacitor blanks in a continuous manner.

It is another object of this invention to automatically present wound capacitor blanks to a continuous supply of terminal wires and thereafter to physically and electrically join the blanks to terminal wires forming a continuous string or chain.

Another object of the invention is to bond the capacitor blanks and terminal wires together by selectively heating short portions of the terminal wires immediately adjacent to the capacitor blank by electrical means.

Still another object of the invention is to deform a continuous chain of assembled lead wires and capacitor blanks by moving portions of the lead wires intermediate the blanks towards each other so as to provide a desired formation or upset in the lead wires, for which upsets facilitate their later assembly to a circuit board or the like.

A further object of the invention is to provide apparatus and method for swaging the capacitor leads to facilitate later assembly of the capacitor to a circuit board or the like.

Another object of the invention is to provide a cutoff means which will cut the continuous chain of capacitors and lead wires to discrete units of desired length.

A still further object of the invention is to provide a transfer mechanism which will transfer the individual discrete capacitor units after severing thereof from the chain to a loading mechanism for automatically applying a protective coating to the rolled capacitor body portion only.

Another object of the invention is to provide a testing means associated with the transfer mechanism for automatically testing the electrical characteristics of all of the finally assembled capacitors prior to application of the protective coating operation.

Still another object of the invention is to provide a tamping means for tamping the ends of the capacitors during the application of the lead wires to the capacitor blanks to provide a precise size for the capacitor unit.

Another object of the invention is to provide a method and automatic apparatus which will assemble capacitors in a fast repetitive manner, which may be readily varied within wide ranges depending on the end product desired, and is otherwise well adapted for the purposes for which it is designed.

The novel features that are characteristic of the invention are set forth with particularity in the appended claims. An understanding of the invention, from a structural and functional standpoint, together with additional objects and advantages thereof, will be best understood by reading the following description in conjunction with the accompanying drawings, wherein:

FIGURES 1A and 1B taken together are a single perspective view, in semi-diagrammatic form, of the novel apparatus for automatically assembling capacitor workpieces to terminal wires, the flow of material through the apparatus being from the upper right-hand portion of FIGURE 1B to the lower left-hand portion of FIGURE 1A;

FIGURE 3 is a plan view, partially in section, of a portion of the apparatus for presenting the terminal wires to the assembly station;

FIGURE 4 is a sectional view along lines 4—4 of FIGURE 3;

FIGURE 4A is a sectional view along lines 4A—4A of FIGURE 3;

FIGURE 4B is a sectional view along lines 4B—4B of FIGURE 4A;

FIGURE 5 is a top view of a portion of the apparatus shown in FIGURE 3 and taken along line 5—5 of FIGURE 6;

FIGURE 6 is a sectional view along line 6—6 of FIGURE 3;

FIGURE 7 is a sectional view along lines 7—7 of FIGURE 6;

FIGURE 8 is a semi-diagrammatic view showing the electrical circuit for heating portions of the lead wires adjacent to the ends of the capacitor coils for causing bonded engagement of the lead wires thereto;

FIGURE 9 is a view, partially in section, along lines 9—9 of FIGURE 10 showing the apparatus for simultaneously heating and biasing the terminal wires into the ends of the capacitor workpiece;

FIGURE 9A is a perspective view of one of the components shown in FIGURE 10;

FIGURE 10 is a view, partially in section, showing that portion of the apparatus for applying the terminal wires to the ends of the capacitors;

FIGURE 11 is a top view of the component shown in FIGURES 12 and 13, said component being the crimping mechanism for permanently deforming the terminal wires intermediate the capacitor blanks while the capacitor blanks and terminal wires are in a chain form shown in FIGURE 1D;

FIGURE 12 is a front elevational view of the components shown in FIGURES 11 and 13;

FIGURE 13 is a left-hand end view of the component apparatus shown in FIGURE 12;

Figure 1A:
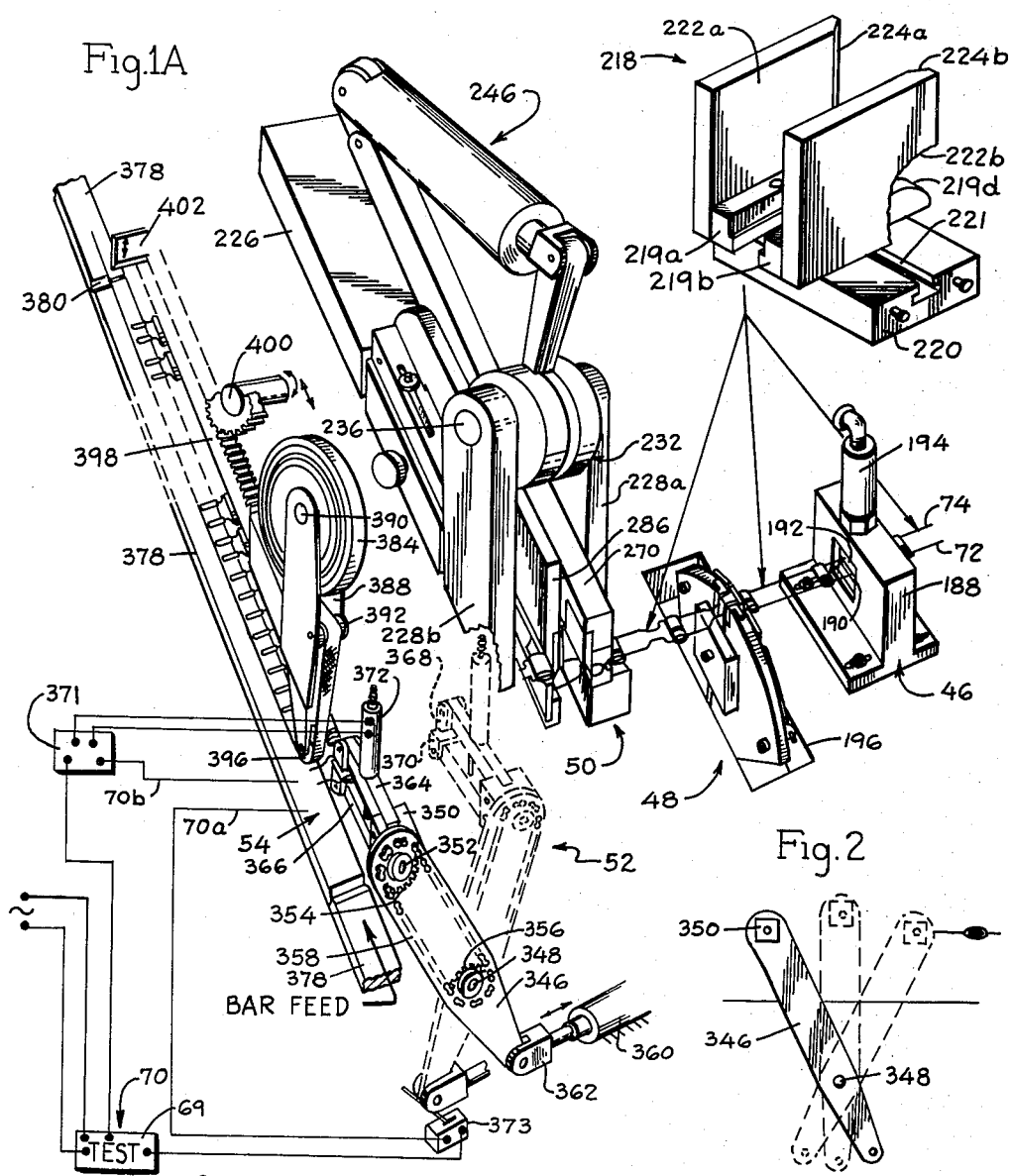
FIGURE 1C is a perspective view, in semi-diagrammatic form, of apparatus for applying a spray metal coating to the ends of certain capacitor foils and an alternate means for applying a protective coating to the capacitor.
FIGURE 1D is a perspective view of a partial chain of capacitor blanks and terminal wires, the wires having been physically and electrically joined to the capacitor blanks and are an intermediate product of the apparatus.
FIGURE 1E is a perspective view of one form of a capacitor unit produced by the method and apparatus.
FIGURE 1F is a perspective view of an alternate to the tamping head shown in FIGURE 1B, and is of the type particularly desirous for metalized foil-type capacitors.

Before describing the details of the apparatus 16 a study of the perspective views FIGS. 1A and 1B is suggested. The apparatus 16 shows a wire supply 18 in the form of a spool of wire. An identical second wire supply used with the apparatus is not shown. The wire may be of copper or steel cored copper of suitable gauge. De-reeling apparatus 20 of suitable form unwinds the wires 72 and 74 from the spools 20 through wire straightening devices 24 which relieves the tortional strain from the wire. Means 26 is provided for presenting the wires 72 and 74 in spaced arrangement at an assembly station 22, said means being in the form of wire orienting and wire moving means which intermittently moves the wires to the precisely desired locations relative to the other components.

Hopper means 28 contains a supply of capacitor bodies or workpieces 32 having an orienting band in the form of an electro-static shield 34. The shield 34 is located adjacent to one end of the body 32 (see FIG. 1D). The blanks 32 are hopper fed through an orienting apparatus 30 and down a track means 36. The orienting apparatus 30 has detection means responsive to the electro-static shield 34 and orients the bodies in end to end position, the shield 34 being closer to the leading end of the individual bodies. Vibrator means 38 cause the capacitor foil-blanks 32 to move successively down the track 36 in end to end relationship. An escapement mechanism 40 near the end of the track 36 releases the capacitor blanks successively in oriented relationship to each other and delivers them to the assembly station 22 in intermittent timed relationship to movement of the wires 72—74 and the movement of components.

At assembly station 22 the wires 72 and 74 fed from the spool supplies are positioned to engage opposite ends of the oriented blank 32 fed from the hopper means. The terminal wires 72 and 74 together with the blank 32 are moved as a unit to the lead applying means 42 which permanently bonds the wires 72 and 74 to each of the blanks 32. Auxiliary lead tamping means 44 and 44a (the position of the latter being shown only in dotted lines) may be associated with the lead applying means 42 when it is desired to tamp the lead wires into the ends of the capacitors in the lead applying operation. Wire vise means 46 located to the left of the lead applying means 42 serves to fix the position of the components during the application of the leads to the capacitor bodies, as well as for subsequent operations.

With successive operations of the lead applying means 42, a chain of capacitors is formed on the pair of continuously fed terminal wires (see FIGURE 1D). Thereafter, the chain is passed through a crimping means 48 (FIGURE 1B) which deforms the terminal wires intermediate the spaced bonded capacitor blanks. After the crimping operation, the capacitor blanks and terminal wires in chain form, move to a swager and cut-off means 50 which may be set to simultaneously swage the terminal wires and cut the lead wires to provide discrete capacitor units.

The individual capacitor units so formed are then moved by a transfer mechanism 52 to one of two loading-coating mechanisms 54 or 56. Electrical test means 70 may be associated with the transfer mechanism 52 to test each of the capacitor units for electrical characteristics to separate units having varying characteristics as well as malformed capacitor units.

The loading-coating mechanism 56 (see FIGURE 1C) has associated therewith, a spray mechanism 58 which applies metalizing spray to the ends of certain capacitors, a preheat means 60, a dip vat 62 for applying a protective coating of dielectric material to the rolled portion of the capacitor, and a curing oven 64 for curing the protective coating. Also, marking means 66 may be conveniently placed at the output end of the curing oven 64 so that the discharge or unloading station of the mechanism 56 will provide a succession of capacitors ready for packaging and subsequent marketing.

A detailed description of the major components and operations of the apparatus 16, the wire orienting and advancing means 26 (see FIGURES 3-7) will now be described. The two wires 72 and 74 as they leave their respective spools, passing through the wire straightening means 24, continue their movement from the top to bottom, as shown in FIGURE 3. The same movement is illustrated from right to left in FIGURE 1B. The means 26 has a base 76 having a pair of horizontal leg portions 76a and 76b with mounting slots therein. The leg portions are adapted to be fixedly mounted on a suitable table or the like. A pair of spaced vertical upright end portions 78 and 80 are fixed relative to the base 76 and mount a pair of spaced horizontal slide rods 82 and 84. A carriage means 86 is mounted for sliding movement on the rods 82 and 84.

The upright portion 78 has associated therewith jaw block means 100 capable of up-down movement for sequentially engaging opposed sides of the wires 72—74. The jaw block means 100 is intermittently actuated by an air cylinder 102 in timed relationship to the movement of the other components. The up-down jaw block means 100 (see FIGURES 5, 6 and 7) includes an insert 104 which is actuated by air cylinder 102 in a generally vertical plane in a housing 106. The insert 104 is biased away from the top surface of up-right end portion 78, by suitable springs 108. The bottom of member 104 is rounded at 110 (see FIGURE 7). Member 104 together with the top surface of up-right 78 form a pair of clamping jaws for stabilizing the position of wires 72 and 74 which are disposed therebetween (see FIGURE 6). The upper surface of insert 104 is formed with a centrally located conical bore 112, which receives the end of the air cylinder actuator 102 to move the insert against the bias of springs 108. Thus, jaw-block means 100 is in effect, a releasable wire vise.

The carriage means 86 comprises a carriage base 88 having a movable jaw block means 90 associated therewith. The movable jaw block means 90 has a left actuator 92 and a right actuator 94 (see FIGURE 3) which are mounted on the carirage base. The actuators 92 and 94 are air cylinders and intermittently actuate the jaw block assembly 90 into engagement with wires 72—74 in timed relationship to the movement of the other components to be described.

The movable jaw block assembly 90 mounted on carriage base 88 forms another wire vise and further includes a left actuator extension 114 and a right actuator extension 116 in generally opposed relation (see FIGURES 3-4) which have mounted on their ends the jaw member inserts 118 and 120 respectively. A pair of semi-floating jaw inserts 122 and 124 are mounted intermediate jaw inserts 118 and 120 for cooperation therewith. The inserts 122 and 124 are biased by springs 126 into engagement with adjustable pins 122a and 124a (best seen in FIGURE 3). Access to the pins may be had through the holes in carriage cover plate 125. (The plate is shown broken away in FIGURE 3 with only the pins remaining for purposes of clarity.) The pins 122a and 124a fix the outward position (away from each other) of the inserts 122 and 124. The pins 122a and 124a may be suitably mounted on the carriage base 88 so that their positions may be readily adjusted. The initial position of inserts 122 and 124 is determined by the positions of the four pins 122a and 124a. By varying the positions of the pins relative to each other the at-rest position of the inserts 122—124 may be varied. This determines the desired spacing of wires 72 and 74 which are respectively placed between the jaw inserts 120—124 and 118—122. The actuators 92 and 94 through the extension members 114 and 116 may move members 118 and 120 toward each other and compress the inserts 122 and 124 to simultaneously grip the wires and move the wires 72 and 74 closer together. The springs 126 are relatively heavy springs and hence the movement of actuator extension members 116 and 114 toward each other will serve to clampingly engage portions of each of the wires such that movement of the push-pull actuator 96 when the jaws are clamped on the wires will accomplish movement of the wires along with the carriage means 86.

Immediately below the assembly station 22 is an adjustable platform means 128. The platform means 128 includes a tongue member 130 which is mounted on a base 132 (see FIGURES 4A-4B). The base 132 is, in turn, mounted on upright 80 (see FIGURE 1B). A wire height fixing means 134 (FIGURE 4A) is located on the right hand side of the tongue member 130 and is adapted to adjustably fix the vertical height of the wires 72 and 74 relative to tongue 130 while permitting relative horizontal movement of the wires.

The wire height fixing means 134 comprises a generally flat lower member 134b and an upper member 134a being U-shaped in configuration. The legs of members 134a form a recess and define the outer horizontal extent of movement of the wires 72 and 74 which are trapped between members 134a and 134b. Adjusting bolt 134c permits adjustment of the height of members 134a—134b relative to the platform tongue 130.

The platform tongue member 130 is itself adjustable in height relative to base 132. Three adjusting bolts 136

(see FIGURE 4A) permit adjustment of the platform relative to base 132, as desired.

A carriage platform cover member 138 is mounted on the carriage means 86 just ahead of the movable jaw block assembly 90 for movement therewith (FIGS. 4A and 1B). The leading edge of the cross member 138 has mounted thereon a spring member 140 which is bifurcated on its depending end 142. The member 140 serves to reorient misaligned capacitor blanks located between the spaced wires 72 and 74 at the assembly station 22 where the blanks are fed from the hopper means 28.

The front end of platform member 130 is necked down at 130a to a dimension less than the length of the capacitor bodies 32 (shown in dotted lines of FIGURE 3). The end 130a of the tongue member fits between the movable jaws of the lead applying means 42, but is shown spaced therefrom in FIGURE 1B for purposes of clarity.

The lead applying means 42 for causing bonding engagement of the wires 72 and 74 to the ends of the capacitor bodies 32 comprises movable jaw means projecting through an apertured table and an overhead support member 144. Mounted on member 144 is a depending orienting flexible leaf spring member 142 which serves as a resilient stop for the capacitor workpiece blank to assure correct initial orientation of the blank between the four part head of the lead applying means 42. (See FIGURE 1B.) The overhead arm 144 may be suitably mounted on the worktable as desired. The tamping means 44 (which is not needed on the assembly of all forms of capacitor) will be described later.

The worktable may be apertured at 148 so that only the four head portions of means 42 projects therethrough on opposite sides of the path of the two wires 72 and 74. A bracket 150 may be mounted in depending position from the worktable in the vicinity of the aperture 148 to support most of the components making up the lead applying means 42. A block 152 may be fixed on bracket 150 (see FIGURES 9A and 10) and is formed with a bore 154. A pair of pivot shaft pins 156 and 158 are mounted on the block 152 transverse to, on opposite sides of, and slightly above the bore 154. A movable element of air cylinder 160 projects through the bore 154 of block 152 to actuate two pairs of movable blade members 162a—b and 164a—b. Each of the four blades 162a—b, 164a—b is made of an electrically conductive material. Blade members 162b and 164b are longer than their respective companion blade members 162a and 164a. Blades 162b and 164b are pivotally mounted on pins 158 and 156 of blocks 152 respectively. Each of the blades mounts a head or jaw portion of electrically conductive material 168a—b and 170a—b. The two pair of blades 162a—b and 164a—b are insulated relative to each other by suitable insulator blocks such as 166 (see FIGURE 9). Biasing means 172 in the form of a tension spring, biases the pairs of blades 162a—b and 164a—b towards each other. Rollers 174—176 mounted on the insulator blocks 166 between the blades are biased into engagement with cam surface 180 on the air cylinder actuator extension 178. Thus movement of the air cylinder 160 will cause movement of cam surface 180 which will move the blades apart against the return bias of spring 172.

As mentioned, the blades 162a—b and 164a—b are electrically insulated one from the other. The heads 168a—b and 170a—b are preferably formed of copper with each having a V-shaped groove therein which engage the wires 72 and 74 on opposite sides of the workpiece blank 32 as shown diagrammatically in FIGURE 8. As air cylinder 160 moves rod 178 upwardly, a cam shoulder 182 thereon engages an actuator roller 186 of a switch 184. The switch 184, in a circuit with an electrical source, when actuated causes a current to pass (in series arrangement) through the four blades and through the terminal wires as shown semi-diagrammatically by the arrows in FIGURE 8. To complete the electrical circuit from the source of high amperage electricity between the members 162a and 164a, and between 162b and 164b, heavy "battery strap" type cables 188a—b are attached to each of the members at the bottoms thereof (see FIGURES 8-9-10). The circuit is thus from the source of electricity, a variable tap transformer 185, through electronic timer means 183, through switch 184, through cable 188a, through blade 164b and head 170b, through a short stretch of wire 72, through head 170a and blade 164a, through cable 188b, through blade 162a and head 168a, thence through wire 74, through head 168b and blade 162b, and finally through cable 188a back to the source. The small cross sectional area of wires 72 and 74 relative to the cross sectional area of the rest of the circuit, causes wires 72 and 74 to be resistance elements and causes them to become heated rapidly.

It will be noted that the spring 172 is sufficiently strong so that movement of cam surface 180 out of contact with rollers 174—176 will present a strong biasing force on members 168a and 170a and 168b and 170b in a generally inwardly direction forcing the heated portions of wires into the end surfaces of the capacitor blank or body 132. The duration of the current is short so that the plastic material which is heated to its melting point will quickly cool and fuse around the wires as will be discussed.

Immediately to the left of the lead applying means 42 (see FIGURES 1B-1A) is the wire vise means 46 which is similar in function to the up-down wire vise means 100 shown in FIGURES 5, 6, and 7 except that it must have sufficient movement to accommodate the capacitor foils and lead wires in assembled relation. The wire vise means 46 comprises a base portion 188 which is fixedly mounted relative to a worktable or the like having a rather large central aperture 190. Movable jaw means 192 is actuated by air cylinder means 194. The air cylinder is actuated in timed relationship to the movement of the other components of the apparatus. Movable jaw member 192 has sufficient movement to allow the capacitor bodies to easily pass between it and the fixed jaw member. As shown in FIGURE 1A, the movable member 192 is adapted to impinge upon the wires 72—74 intermediate the mounted capacitor bodies and firmly holds the chain of capacitors in fixed position for the operation of the immediately preceding station where the lead applying means 42 is operative and also for the next succeeding operation of crimping the lead wires.

Immediately to the left of wire vise means 46 (see FIGURE 1A) is the crimping means 48 which is conveniently mounted on the underside of the worktable and projecting through an aperture 196 in the worktable into the path of the chain of assembled capacitor bodies and wires. This crimping operation is accomplished in timed relation to other operations. Crimping mechanism 48 comprises a vertical base plate 198 having a vertically arranged portion 200 (see FIGURES 11, 12 and 13). The plate 198 with member 200 may be mounted on suitable horizontal support elements 199a—199b, which in turn are supported by a plate 201. Support elements 199a—b each have a pin to provide a hinge to allow movement of the crimping jaws 48 into and out of operative position.

Plate 201 is formed with spaced rollers 201a and 201b which ride in vertical tracks 201c and 201d mounted on the worktable. An air cylinder actuator 201e moves the entire crimping means 42 up as well as down relative to the worktable. The air cylinder 201e is mounted on extension plate 200 and may be fixed to a cross brace of the worktable (not shown). Upon actuation of cylinder 201e, plate 201 will move on rollers 201a and 201b in tracks 201c and 201d causing movement of the entire mechanism from a retracted position to the position shown in FIGURE 1A.

A second air cylinder actuator member 202 may be mounted on member 200 and (through extension 204) is adapted to move head members 205—206 toward and away from each other in timed relationship to movement of the chain of capacitor blanks and wires as they leave the lead applying means, as well as in timed relation to movement of the entire apparatus in an upwardly-downwardly direction by actuator 201e.

Head blade members 205 and 206 are each pivotally mounted at 207—208 and 209 and 210 respectively. The blade members 205—206 have a scissors action, actuated by toggle members 211—213 which are pivotally attached to the yoke member 204. The yoke 204 slides on a keyway 217 and engages a stop 215 to limit its upwardly movement. A channeled guide member 203 retains the blade members 205—206 relative to plate 198, on which it is mounted. Actuation of air cylinder 202 causes movement of the toggle members 211—213 in an outwardly divergent direction, the scissor blade members 205 and 206 pivoting about pivots 208 and 210 respectively. In turn, forming head portions 212 and 214, located on the upper ends of blades 205 and 206, move toward each other to engage portions of the lead wires 72 and 74 intermediate successive capacitors 68 in a chain of them. The engaged portions of the wires 72 and 74 are forced against a forming mandrel member 216 which is fixedly mounted on the top of plates 198—200. The form of the crimp made may be of any form. Certainly the forms shown in the co-pending applications of Rayburn (S.N. Nos. 45,323 and 45,421) would be examples of preferred configurations.

Intermediate guide means 218 may be interposed between the lead applying means 42 and the wire vise means 46; between the wire vise means 46 and the crimping means 48; and between the crimping means 48 and the swaging and cut-off means 50 (see FIGURE 1A, upper right-hand corner). The wire guide means 218 provide restraint against deviations in the horizontal and vertical positions of the chain of capacitor bodies and wires during movements between the various stations. Guide means 218 consists of a base 220 which is mounted on the worktable and formed with a keyway 221. A pair of up-standing vertical members 222a, 222b are adjustably mounted on the keyway 221 and are set for the desired dimension of the capacitor workpieces being assembled by the apparatus and to pass therethrough. The leading edges 224a and 224b of members 222a and 222b are preferably beveled to prevent snagging of the workpieces. Horizontal portions 219a and 219b of the upright members 222a and 222b respectively are beveled at the lead-in edge as shown at 210d to provide a tapered lead-in to facilitate passage of product.

The swager-cutoff means 50 is located immediately to the left (or down stream in terms of flow of movement of the materials) of the crimping mechanism 48 (see FIGURE 1A). The essential function of the swaging cutoff mechanism is to receive the chain of assembled capacitor bodies and wires from the crimping mechanism and to simultaneously swage to a desired configuration and then cutoff the lead wires to desired length.

The swager-cutoff mechanism 50 comprises a base 226 (see FIGURES 1A and 14) mounting a pair of upstanding vertical arms 228a, 228b in generally opposed relation on opposite sides thereof. Near the tops of the arms 228a—228b are a pair of bores 230a—230b which serve to mount an eccentric mechanism 232. The eccentric 232 comprises a pivot shaft having end portions 234—236 which are adapted to be respectively mounted in bores 230a and 230b. The center of the eccentric has two offset cam surfaces 238 and 240 and an up-standing vertical lug 242 having a bore 244 in the end thereof. An air cylinder 246 having a yoke extension 248 is connected to lug 242 by a pin 249 inserted through hole 244. The other end of the air cylinder actuator 246 has a cross bored yoke member 250. Similarly, a pin 252 is inserted in the cross bore of yoke 250, through bore 254 of arm 256 which is mounted on base 226. Selective actuation of the air cylinder 246 causes eccentric 232 to rotate about the axis of ends 234—236 moving cam surfaces 238 and 240. The movement of the eccentric 232 simultaneously moves mechanisms 260 and 258 in timed relationship.

The first mechanism 260 comprises an arm 262 having a bifurcated end yoke portion 264 with a cross bore 266 adapted to be mounted on through pin 268 on upright rear base arm 256. Mounted on the free end of arm 262 is a head mechanism 272 which simultaneously swages and cuts both of the wires 72 and 74. The movable head mechanism 272 has two portions, a swaging head 74 and a cutter member 276 which are co-actable with fixed block 278. Block 278 is adjustably fixed to the base 226 and has a top swaging surface of preselected configuration for co-action with the head 274. The block 278 also has a shear surface 280 for co-action with the cutter portion 276 (see FIGURE 14A).

The top surface 270 of arm 262 is engaged by cam surface 238 on eccentric 232 to cause actuation of the movable arm against the bias of a strong spring 282. The spring, mounted in a spring guide bore 284 in the base 226, engages the under side of arm 262 to bias it into engagement with cam surface 238.

The second mechanism 258 includes a movable arm 286 having a top surface 288 engagable with cam surface 240. Movable arm 286 is mounted on sub-base 290 and pivots on arm 292. Arm 286 has a movable sub-arm 294 which mounts on its free end a cutter blade 296. This cutter blade co-acts with an opposing fixed cutter member 298 on the end of sub-base member 290. The sub-arm 294 has a short upstanding lug 295 which is engagable with the under surface 299 of a slot 297 in arm member 286. The sub-arm 294 is pivotally mounted on 286 by a pin 302 which passes through a bore 300. The sub-arm member 294 has an elongated curvilinear slot 306, larger than and surrounding pin 304, also mounted on arm 286. A spring 308, mounted in spring guide bore 310, biases sub-arm 294 away from arm 286 by engaging the under surface 299 of the slot 297. Downward movement of arm 286 by engagement with cam surface 240 causes cutter blade 296 to cutting position with fixed blade 298.

The sub-base 290 is formed with a spring guide bore 314 which mounts a biasing spring 312 to engage the underside of arm 286. Spring 312 biases the arm 286 into constant engagement with cam surface 240. The sub-base 290 is adjustably mounted in a keying lug 320 of the sub-base 290 by mounting bolt 322 extending through an elongated slot 324 for cooperation with a threaded bore 326 in the block 316. The key block 316 with horizontal cross bores 328 and 330 serve to mount the block 316 on horizontal pins 332 and 334 which are fixed to base member 226. Springs 336 and 338 surround the respective pins 332 and 334 and bias the block 316 away from the base 226. A threaded stud member 320, located intermediate pins 332 and 334, extends through a bore 342 in block 316. A threaded adjusting nut 344 retains the block 316 relative to the base 226 in final adjusted position.

Figure 14:
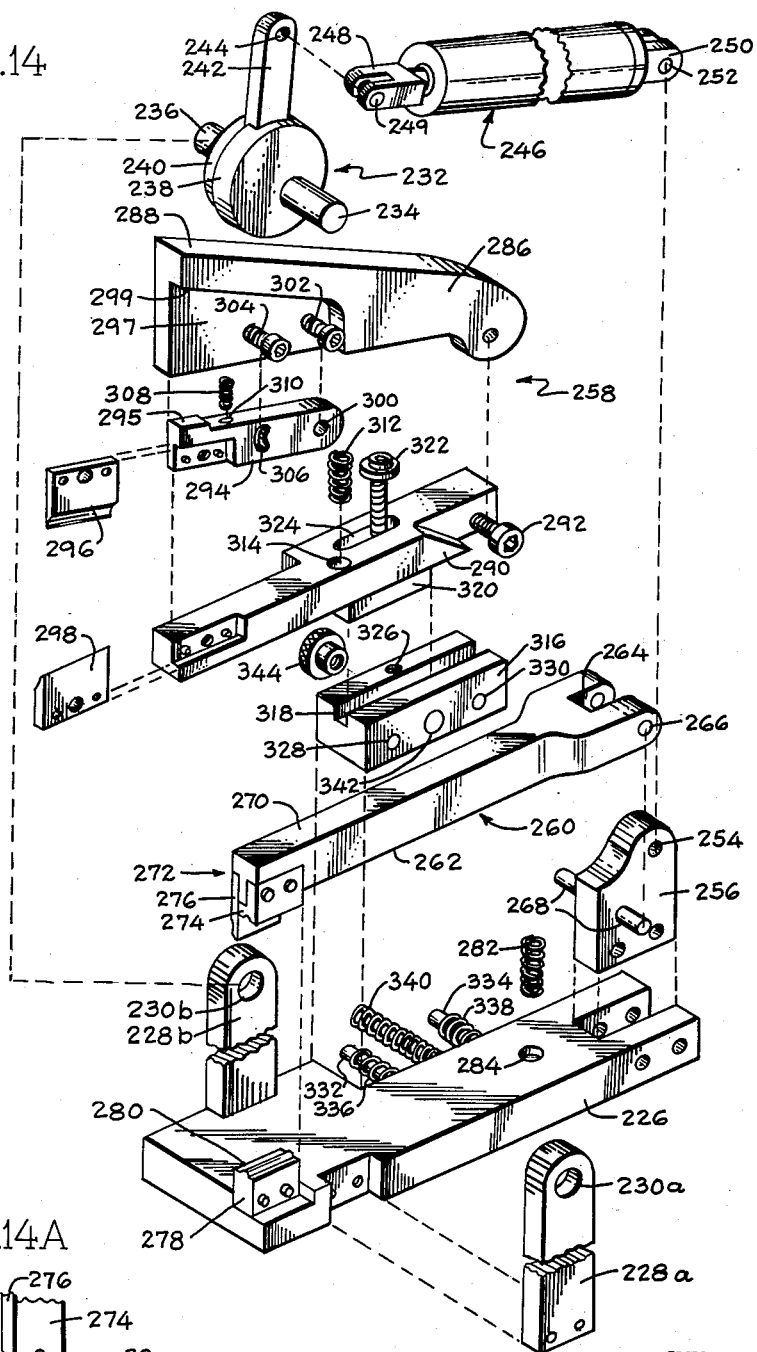
FIGURE 14 is an exploded perspective view of the components which form the variable cut-off and swaging operation on the terminal wires.
Figure 14A:
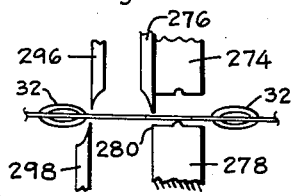
FIGURE 14A is a semi-diagrammatic view of the apparatus in FIGURE 14 showing one relative location of the cut-off and cut-off swaging heads associated with a capacitor chain.

It will be seen from studying FIGURE 14 that all of the tool surfaces are adjustably mounted relative to each other to permit latitude of adjustment for desired variables in configurations of lead wires. The positions of the mechanisms 258 and 260 can be adjusted to provide variable cutting distances between the cutoff bit portions 276—280 and 296—298. Cutter blades 296 and 298 normally cut the spaced wires 72 and 74 immediately adjacent to the capacitor body (see FIGURE 14A). The cutter blade 276 cooperating with surface 280 on block 278 normally cuts the wires 72 and 74 at a point intermediate two capacitor bodies (see FIGURE 1A). The intermediate scrap portion falls out and thus discrete capacitor units are formed. Since sub-arm 294 is independently pivoted relative to arm 286, cutters 296—298 cut the wires subsequent to the cutting of the wires by cutter 276 and shear surface 280.

At the output end of the swager cutting mechanism 50 (to the left of FIGURE 1A) the transfer mechanism 52 transfers the capacitors to one of various types of loading mechanisms for later application of a protective coating.

Figure 2:
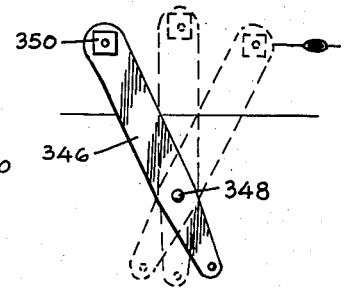
FIGURE 2 is an end view of the three positions of the transfer mechanism (in semi-diagrammatic form) as shown in the left-hand portion of FIGURE 1A.
Figure 2A:
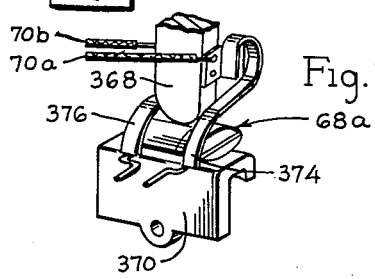
FIGURE 2A is a perspective view of the clamping jaws of the transfer mechanism showing the position of testing probes which may be associated with one of the clamping jaws.

The transfer mechanism 52 comprises a movable arm member 346 located preferably in a vertical plane. The arm 346 is pivotally mounted at 348 to a suitable frame member (not shown). At the top end of arm 346 is a pair of opposed horizontal arm portions 364—366 mounted on jaw block member 350. The jaw block member 350 is pivoted on arm 346 at 352. A sprocket member 354 is keyed to block 350 for movement therewith to maintain the block 350 in the same horizontal plane, but independent of the vertical plane of arm 346. To accomplish this, a sprocket member 356 is fixedly mounted to the lower portion of arm 346 and a movable sprocket 364 is mounted to block 350 and is driven by a suitable chain member 358. The movement of arm 346 about pivot 348 causes the movement of sprocket 356 and hence chain 358, the relationship being such that block 350 is maintained horizontally aligned at all times as shown diagrammatically in FIGURE 2. Thus, arms 364 and 366 and jaw members 368 and 370 on the ends thereof also remain horizontal in normal operation.

An air cylinder actuator 360 for the transfer mechanism 52 in actuated in timed relationship to movement of the swager-cutter mechanism 50. It is formed with an extension yoke 362 which is adapted to pivot arm 346 about the axis 348. Simultaneously, and in timed relation with movement of arm 346 between the pick-up station and the release or loading station (at the end of the throw of the arm 346), is the actuation of up and down movable arms 364—366. The arms 364—366 and head portions 368—370 are actuated by an air cylinder 372 mounted on arm 364.

As previously indicated, testing means 70 may be associated with the transfer mechanism 52. To accomplish this a control means 371 is associated with air cylinder 372. Control means 371 is in circuit with a testing control panel and mechanism shown diagrammatically at 69 and a switch 373. A pair of conductors 70a and 70b emanate respectively from the air cylinder actuator control member 371 and switch 373 and terminate as conductive springy depending members 374 and 376 mounted on the upper jaw member 368 of the transfer mechanism. Switch 373 may be actuated by the air cylinder 360 to cause a testing current to be placed through the capacitor leads between jaw members 368 and 370. Each capacitor may be individually and automatically tested prior to being given its protective coating. If the capacitor is found defective, air cylinder 372 is actuated by the electric control 371 causing opening of the jaw members and rotation of jaw 370 to cause the capacitor to be rejected prior to reaching the loading station for the coating operation.

As aforediscussed one of two types of loading mechanisms 54 or 56 is utilized at the outer end of the throw of the transfer mechanism 52. The particular loading and handling mechanism utilized depends upon subsequent operations to be accomplished on the particular capacitor product being processed through the apparatus. For capacitors that subsequently require only the application of a protective coating to the body portion, the loading mechanism 54 (as shown to the left in FIGURE 1A), is adequate. This loading mechanism 54 includes a plurality of movable base bar members 378 movable in a direction transverse to the movement of the loading mechanism 52. Ends 380 and 382 of each of the movable bars 378 are beveled and the bars 378 preferably slide in a track so that the next adjacent bar with its beveled end portion of substantially identical construction will form a V-shaped groove when the two bars are placed in abutting relation. A roll of pressure sensitive tape 384 is rotatably mounted above the bars 378 on spaced uprights 386 and 388 and about a pin 390. The tape is fed over a roller mechanism 392 and a pressure foot 396. The uprights 386—388 and their supporting mechanism are mounted on a rack and pinion set 398—400 for relative movement of the tape disposed below the pressure foot along the top surface of the loading bars 378. As shown in full line in FIGURE 1A, the transfer mechanism 52 presents the capacitor units in such a manner that the lead wires extend over the top surface of the bar 378 so that application of the tape 384 captivatingly mounts the lead wires to the bar. However, the rolled portion of the capacitor unit is left exposed. The bars are automatically fed (by means shown diagrammatically in FIGURE 1A) and a cutter blade 402 cuts the tape between adjacent bars in the V-shaped groove (see upper left-hand portion of FIGURE 1A). The rack and pinion 398—400 and the bar feed are actuated in timed relationship to the transfer mechanism 52 to assure continuous captivation of the capacitor units. The bars 378, after receiving a full load of capacitor units mounted thereon, are then removed to a dipping bath containing suitable epoxy or other protective coating materials. After removal from the bath the coated capacitors are then cured and the tape stripped from the bar to provide a finished capacitor unit. The protective tape serves the dual function of mounting the capacitors for the coating operation, as well as protecting the lead terminal surfaces from contamination during application of the protective coating.

It is sometimes desirable to have precise length dimensions of critical values of the body in the final capacitor product. Since the winding mechanisms presently commercially utilized for winding capacitor foil blanks seldom give a perfectly dimensioned product (due to variation in width of winding strips, stray or weave of the winding strips during the winding operation, etc.) means to precisely dimension the length of the capacitor body for certain applications becomes an important aspect of the machine. In manufacture of capacitors of the metallized film type, it is often desirable to tamp the ends of the capacitor body to insure good electrical contact and firm bonding of the fused thermoplastic material with the lead wires. The tamping means 44 will accomplish these results. It has tamping extensions 45 adapted when actuacted to positively engage the ends of the capacitors during the operation of the lead applying means 42 and form heated plastic material into a compact unit of desired length. The extensions 45 are made of a high temperature insulating material (such as is sold under the trademark "Teflon") and actuated by the air cylinder portion 44 simultaneously with the heads 168a—b and 170a—b of the lead applying means 42 and in timed relationship to movement of all the other components. For metallized film capacitors special tamping heads 45a having a bore 45b therein (see FIGURE 1F) are preferably used. The bore 45b is smaller than the diameter of the capacitor blank 32 so that the outer edge of the films are forced into solid bonding relationship with the wires, but leaving an area near the center of the capacitor blank open for receipt of a metallizing spray for subsequent processing.

After the metallized film capacitors have been assembled, the transfer mechanism 52 presents the capacitors to a different loading mechanism 56. The loading mechanism 56 picks up the capacitors at loading station 404. The mechanism 56 has an endless chain mounting a plurality of pick-up members 406. The pick-up members 406 may be of the magnetic variety, spring loaded clamping jaws, or any other suitable configuration which will firmly grasp the ends of the capacitor lead wires and later release same at preselected locations along the path traveled by the two spaced wires 408 which comprise the chain. The movable jaw members or pick-up members 406, after receiving the capacitors at stations 404, pass by a pair of revolving spaced wheel members 410a—b having peripheral apertures 412. The apertures 412 and the path of the members 406 is such that the ends of the capacitors come into aligned position with the apertures 412 as the respective paths of the apertures and members 496 blend together. Paint spraying mechanism 414 (only one shown) is adapted to spray metallized paint upon the ends of the capacitors located in the members 406, the excess paint being sprayed on the wheels 410 and being automatically washed or rinsed off of the wheel on each revolution thereof (by means not shown). The capacitors are then moved by members 406 past a pre-heat station 60, comprising suitable heating means such as infrared heaters 416 which are adapted to heat up the capacitor body for the dual purpose of drying the metal spray and to prepare the capacitor body to more readily accept the protective coating. The capacitors are then moved by members 406 to a dipping vat 418 containing liquid resinous material 420 and then passed through a drying oven 64 for curing of the resinous material. The coated capacitors then pass by the marking means 66 whereupon the marking heads 424 properly mark the capacitors with the desired information thereon. The capacitors are then unloaded from members 406 and are packaged and shipped to market.

*Operation*

The operation of the apparatus 16 is essentially as follows: Wires 72 and 74 are de-reeled from the supply reels 20 as it is pulled by the wire orienting and wire moving means 26. The up-down jaw block means 100 is in clamping relationship to the wires. The carriage means 86 is located in the position as viewed in FIGURE 1B. An oriented capacitor blank is escaped from the track 36 by the escapement 40 into the assembly station 22. The adjustable platform 128 carries the capacitor blank at its proper height (size dependent) for orientation relative to the wires. Jaw block means 100 now releases the wires 72—74 and the movable jaw block assembly 90 left and right actuators 92—94 are actuated to place jaws 118—122 and 120—124 in firm clamping engagement to the wires. This causes the wires to clampingly engage the ends of the capacitor blank 32. The push-pull actuator 96 moves the entire carriage means 86 forward (to the left as viewed in FIGURE 1B). The movement of the carriage means 86 causes fingers of the pusher orienting spring 140 to engage the capacitor blank to assure orientation thereof and to move the capacitor blank and wires simultaneously. The actuator 96 stops the carriage means 86 when the capacitor reaches a center position relative to the lead applying means 42. This movement of the carriage means causes movement of the wires from the supply means. The capacitor slides along the platform and the depending fingers 146 of means 42 help to correctly align the capacitor in its position.

It will be realized that the capacitor is escaped onto the adjustable platform prior to movement of the carriage means 86 and prior to the actuation of the left and right actuators 92 and 94, the movement of the actuators causing movement of the wires into a clamping engagement with the capacitor blank so that the wires and the capacitor blank move as a unit to the station between the heads of the lead applying means 42 upon movement of the push-pull cylinder 96. It is not absolutely necessary to clamp the wires to the capacitor ends since fingers 142 of member 140 will move the capacitor blank into position at the lead applying means.

When the capacitor is correctly aligned in the lead applying means, both air cylinders 102 and 104 are actuated to cause the jaw vises associated therewith to firmly clamp the wires into fixed position. The push-pull actuator 96 then moves the carriage means 86 back to the initial position upon the release of the wires 72 and 74 by the movable jaw block means 90. Meanwhile, the lead applying head of means 42 closes to contact each wire 72 and 74 on each side of the capacitor blank. The contact portions on the head 168a—b and 170a—b of the lead applying means 42 are automatically connected to a power source in a series of arrangement which affords the same current flow through both wires for the same duration. The amount of current is controlled by a suitable transformer tap adjustment 185 and applied for a duration as set on a precision electric timer 183. This causes the wires to heat up and melt into the thermoplastic portions of the capacitor foils. Since the application of the current is for a short duration, the wires cool and the melted thermoplastic from the dielectric films fuses around the wires.

An alternate to the use of a precision timer 183 to provide the exact desired duration of electric power application to means 42, is the use of a voltage sensitive control means (not shown). A voltage sensitive control means allows the current to flow as the potential across the lead applying contacts 168a and 170a is increasing, but opens the circuit automatically as the potential thereacross is noted to decrease. This decrease is produced when the wires 72 and 74 contact another material other than the one they are melting through and the additional heat required by the new material extracts heat from the portions of wires 72 and 74 being heated, which lowers the wire temperature and consequently lowers the electrical resistance. Since the wires 72—74 are mainly formed of copper and copper has a positive temperature coefficient of resistance, the noted drop in potential, by Ohms law, is reflective of the fact that in this particular environment a new material has been contacted. This alternate method utilizing a potential change as noted by the voltage sensing device provides optimum wire placement since it is work dependent rather than time dependent.

The tamping sealing means 44 may be actuated simultaneously with the movement of the heads of the lead applying means 42. The head portions 45 press on opposite sides of the capacitor to reduce the length of the capacitor particularly in the extended foil types of capacitor blanks or where critical size relationships are needed. In the case of metallized foil types of capacitor blanks, the end of the insulating blocks 45 are preferably formed with a hole in the center 45a, which causes the sealing of thermoplastic materials over the wires 72 and 74 on the edges of the capacitor foil, but leaves the wire uncovered in an area near the center of the capacitor end which allows the wire to be contacted directly by a metallic spray in the mechanism 56. (The spray connects all turns of the metallized extension and connects it to the wire leads. The wire lead gains mechanical strength and is bonded to the capacitor through bonding to the plastic and from mechanical holding of the sprayed metallized materials and coating.) The pushers or tampers 44 are also useful in forcing the wire to a control depth into the so-called shear end type of capacitor blanks while sealing the thermoplastic portions over the wires 72 and 74.

The holding means or wire vise means 46 and 100 locks the wires in fixed position during the lead applying operation. The vise means 46, as the lead applying heads 168a—b and 170a—b and the tamping means 44 exert a force on the wires 72—74, preventing the already mounted capacitors from being withdrawn from their indexed position.

In this manner a continuous chain 68 of capacitors and lead wires are formed. The intermediate product is shown in FIGURE 1D and has a somewhat ladder like shape. The operation is continuous and the movements of the various parts are synchronized with each other.

The chain of capacitors 68 are then moved to the crimping mechanism which lowers and rises in synchronization with the capacitor indexing and actuates to perform the desired crimping aforediscussed. A variety of tooling may be provided to the crimping head to give a variety of crimp styles.

After crimping, the cutter swager mechanism 50 simultaneously cuts the chain 68 in two preselected preset positions and swages the leads to desired configurations as provided by the adjustable tooling in the heads of the mechanism. The transfer mechanism 52 then moves the capacitor unit to either of the two loading mechanisms 54 and 56 as aforedescribed and simultaneously tests the capacitor for its electrical characteristics. A third alternative is to have the capacitor dropped from the cutter swager to a conveyor mechanism not shown.

While the specific embodiments of the invention have been shown and described, it is with full awareness that many modifications thereof are possible. The invention therefore, is not to be restricted except insofar as is necessary by the prior art and by the spirit of the appended claims.

What is claimed as the invention is:

1. A machine for assembling rolled capacitor blanks comprising, means for feeding from a supply elongated conductors to an assembly station, means for feeding from a supply of rolled capacitor blanks said capacitor blanks successively to said assembly station, means at a station for physically and electrically joining the conductors to successive blanks and means for removing the joined blanks and conductors from said station.

2. In a rolled capacitor assembling machine, means for presenting cylindrical capacitor blanks between spaced elongated conductors, means at a station for physically and electrically joining the conductors to the blanks comprising electrical means for heating selected portions of each of the conductors immediately adjacent the blanks to bondingly join the conductors to the blanks and means for removing the joined blanks and conductors from said station.

3. In a rolled capacitor assembly machine, means at a station for presenting a plurality of conductors in a first spaced substantially parallel position, means at said station for periodically positioning a rolled capacitor blank intermediate said conductors while in said first position, means for changing the spaced relationship of said conductors to a second position in engagement with said capacitor blank in timed relationship to the periodic positioning of the capacitor blanks, and means for permanently uniting said capacitor blank and conductors subsequent to movement of the conductors to their said second position.

4. In a capacitor assembling machine, means for moving a pair of conductors in spaced relation along a path, means for successively supplying capacitor blanks to said path for bonded engagement with each of said conductors in spaced relation along said path, and means for severing said conductors between said bonded blanks to provide individual capacitor units.

5. In a capacitor assembling machine, means for moving a pair of wire conductors in spaced relation along a path, means for successively supplying capacitor blanks along a path which intersects said conductors path at an assembly station, an assembly head which causes each capacitor blank to be bonded to each of said conductors in spaced relation to each other along said path, and means for severing said conductors between successive bonded blanks to provide individual capacitor units.

6. Assembly apparatus comprising means for supplying a pair of spaced elongated parallel conductors having transversely disposed capacitor blanks bonded thereto in spaced relation along a path, means along said path for moving portions of said conductors intermediate said spaced blanks toward each other to permanently deform each of said conductors, and means for successively severing said conductors intermediate said capacitor blanks to provide discrete capacitor units having conductors with deformed portions attached thereto.

7. In a capacitor assembling machine, means for intermittently feeding at least a pair of spaced substantially parallel elongated conductors to an assembly station, means for supplying to said station a succession of oriented foil capacitor blanks in timed relation to the intermittent movement of said elongated conductors, means to arrange each capacitor blank with spaced portions thereof in contact with each of said elongated conductors, and means for intermittently heating selected portions of said elongated conductors to cause the conductors to be imbedded in the body of each capacitor blank and thereby physically join said capacitor blanks to said conductors.

8. The machine set forth in claim 7 wherein the means for heating the selected portions of the elongated conductors includes means for biasing the conductors towards each other.

9. The machine set forth in claim 8 wherein auxiliary tamping means is associated with said means for heating and biasing the conductors into engagement with the capacitor blanks.

10. Assembly apparatus for physically and electrically joining rolled capacitor bodies having alternate layers of thermoplastic portions and metallic foils to lead wires comprising, means for supplying a pair of lead wires to an assembly station in substantially parallel spaced relation, means for supplying individual rolled capacitor bodies in successive and spaced relation to said assembly station and oriented between said spaced lead wires, means for heating portions of said lead wires to cause the lead wires to be imbedded in said bodies to provide a physical and electrical bond, means for cutting the endless lead wires intermediate spaced capacitor bodies to pre-selected lengths to provide individual capacitor units, and means for transferring the individual capacitor unit to a loading station.

11. Assembly apparatus for physically and electrically joining rolled capacitor workpieces having convolutely wound alternate thermoplastic foil portions and electrode portions to lead wires comprising, means for supplying at least a pair of lead wires to an assembly station in spaced relation, means for supplying individual rolled capacitor workpieces to an oriented position between said spaced lead wires at said assembly station, means for heating at least selected portions of said lead wires to physically and electrically bond said lead wires to the opposite ends of said capacitor workpieces, means for crimping portions of the lead wires to change the spatial relationship of said lead wires, and means for simultaneously swaging and cutting the crimped lead wires to a preselected configuration to provide an individual capacitor unit.

12. Assembly apparatus for physically and electrically joining rolled capacitor workpiece units having thermoplastic portions to lead wires comprising, means for supplying at least a pair of lead wires to an assembly station in spaced relation, means for supplying individual rolled capacitor workpiece units to a position between said spaced lead wires at said assembly station, means to move said spaced lead wires into contact with opposite end portions of said capacitor workpiece unit, means to move the oriented lead wires and capacitor workpiece unit to a second station, means at said second station for heating at least selected portions of said lead wires to physically and electrically bond said lead wires to the opposite ends of said capacitor workpiece units, means for offsetting and permanently deforming the spatial relationship of said lead wires, means for swaging and cutting the lead wires to preselected configuration to provide a capacitor unit, transfer means to move the capacitor unit to a loading station, means associated with the transfer means for testing the electrical characteristics of the capacitor unit, means at said loading station for retaining the transferred and tested capacitor unit by its lead wires with the rolled portion exposed, means for dipping the exposed rolled portion of the capacitor unit in a liquid bath of dielectric coating material, means for curing the coat of dielectric material and means for placing identifying markings on the coated capacitor unit whereby a finished, tested, capacitor is assembled.

13. Assembly apparatus for physically and electrically joining rolled capacitor workpieces having alternate layers of metallic electrode foils and thermoplastic foils to lead wires comprising, means for supplying a plurality of lead wires to an assembly station in spaced parallel relation, means for supplying discrete generally cylindrical capacitor workpieces having spaced opposed end portions to a position between said spaced lead wires at said assembly station, means to move said spaced lead wires into physical engagement with said opposite end portions of said capacitor workpieces to clampingly retain the workpieces therebetween, means for moving the lead wires with the associated capacitor workpieces to a second station, means at said second station for heating at least a portion of each of said lead wires to imbed said lead wires and thereby physically and electrically bond them to the thermoplastic and electrode foils at the opposite ends of said capacitor workpieces, means for changing the original spatial relationship of said lead wires, means for swaging and cutting the lead wires to preselected configuration to provide a capacitor unit separated from the lead wires, means for transferring the capacitor unit to a loading station, means associated with the transfer means for testing the electrical characteristics of the capacitor unit, means at said loading station for retaining the transferred and tested capacitor unit by its lead wires with the rolled portion exposed, means for dipping the exposed rolled portion of the capacitor unit in a bath of dielectric material to coat same, means for curing the coat of dielectric material and means for placing identifying markings on the coated capacitor unit whereby, a finished, tested, capacitor is assembled.

14. Assembly apparatus for physically and electrically joining rolled capacitor workpieces having alternate layers of metallic electrode foils and thermoplastic foils to lead wires comprising, means for supplying at least a pair of lead wires to an assembly station in spaced parallel relation, means for supplying oriented individual rolled generally cylindrical capacitor workpieces, having an electrostatic shield means located on the cylindrical portion adjacent one of the two generally parallel spaced opposite end portions, to a position between said spaced lead wires at said assembly station, comprising, hopper means, track means leading from said hopper means to said assembly station, release means for positioning said workpieces in said assembly station at spaced intervals of time, and orienting means responsive to said electrostatic shield means for orienting said workpiece on said track for oriented position at said assembly station, means to move said spaced lead wires into contact with said opposite end portions of said capacitor workpieces at said assembly station to clampingly retain the workpieces therebetween, means for moving the lead wires and capacitor workpieces to a second station, means at said second station for electrically heating at least a portion of said lead wires to physically and electrically bond said wires to the thermoplastic foils and electrode foils in the opposite ends of said capacitor workpieces, means for changing the original spatial relationship of said lead wires, means for swaging and cutting the lead wires to preselected configuration to provide an individual oriented capacitor unit separate from the endless lead wires and having offset, swaged lead wires terminals connected thereto.

15. Assembly apparatus for physically and electrically joining electrical component bodies having at least a layer of the thermoplastic material with a layer of metallic material to lead wires comprising means for supplying a plurality of lead wires to an assembly station in parallel spaced relation, means for supplying individual bodies to a position between said spaced lead wires at said assembly station, means for heating selected portions of said lead wires to physically and electrically bond said lead wires to said thermoplastic and metallic layers of said bodies and means for cutting the lead wires to preselected configuration to provide a completed individual electrical component unit.

16. In an electrical component assembling machine, means for moving a pair of conductors in spaced relation on a path, means for successively supplying component blanks to said path for bonded engagement with each of said conductors in spaced relation to each other along said path, and means for severing said conductors between successive ones of said bonded blanks and immediately adjacent to one of said blanks to provide individual component units with conductors extending therefrom in one direction only.

17. In an electrical component assembling machine comprising means for presenting workpiece blanks having thermoplastic and metallic portions in adjacent relationship between spaced elongated conductors, means at a station for physically and electrically joining the conductors to the blanks comprising electrical means for heating selected portions of each of the conductors immediately adjacent the blanks to bondingly join the conductors to the thermoplastic portions of the blanks and in engagement with the metallic portions of the blanks, and means for moving the joined blanks and conductors from said station.

18. Assembly apparatus for physically and electrically joining rolled capacitor workpieces having convolutely wound alternate thermoplastic foil portion and electrode portions to lead wires comprising means for supplying a plurality of lead wires to an assembly station in spaced parallel relation, means for continuously moving said lead wires in an intermittent fashion along a first path, means for supplying individual rolled capacitor workpieces in oriented position between said spaced lead wires at said assembly station, means for heating at least selected portions of said lead wires to physically and electrically bond said lead wires to the opposite ends of said capacitor workpieces, means along said first path for crimping portions of the lead wires to change the spatial relationship of said lead wires after bonding of said workpieces to said wires, means for simultaneously swaging and cutting the crimped lead wires to a preselected configuration to provide an individual capacitor unit whereby a capacitor is assembled.

19. Assembly apparatus for physically and electrically joining rolled capacitor workpiece units having thermoplastic portions to lead wires comprising wire reel supply means, wire engaging and moving means for intermittently de-reeling, straightening, and presenting from said wire reel supply means at least a pair of lead wires to an assembly station in a first spaced relation, means for intermittently supplying individual rolled capacitor workpiece units to a position between said lead wires at said assembly station while in said first spaced relation, means for intermittently moving both the lead wires and a capacitor workpiece unit to a second station, lead applying means at said second station for electrically heating at least selected portions of said lead wires to physically and electrically bond said lead wires to the opposite ends of said capacitor workpiece units, crimping means at a third station for offsetting and permanently deforming the spatial relationship of said lead wires while retaining the bonded relationship of said lead wires and said conductors, wire vise means interposed between said second and third stations operable to engage the wires during operation of the means at each of said second and third stations, means at a fourth station for cutting the lead wires to preselected configuration to provide an individual capacitor unit, and transfer means for transferring the individual capacitor unit from said fourth station as an individual entity.

20. The apparatus set forth in claim 26 wherein said lead applying means comprises block means fixedly mounted below said second station, said block being formed with a bore and first and second pivot means, first and second blade means respectively mounted on said first and second pivot means and biased toward each other in generally opposed relation, actuator means extending through said bore for cooperation with said first and second blade means and having closing and opening positions to afford relative closing and opening movement of said first and second blade means, said first blade means, mounting insulatingly spaced first and third wire contacting portions on the free end thereof, said second blade means mounting insulatingly spaced second and fourth wire contacting portions on the free end thereof, all four blade contacting portions being formed of electrically conductive material, said first and second blade portions being disposed in opposed relation, said second and fourth blade portions being disposed in opposed relation, said first and third blade portions being spaced apart a dimension greater than the end dimension of a capacitor workpiece, and said first and second blade portions being electrically connected to opposite sides of a source of electricity, said third and fourth blade portions being electrically connected together whereby electric current supplied to said first wire contacting portion can move to said second wire contacting portion only through a series circuit through segments of lead wires interposed between said first and third contacting members and said second and fourth contacting members when said actuator is in its closing position.

21. The apparatus set forth in claim 19 wherein said wire engaging and moving means comprises, a base, a pair of fixed uprights transverse to said base, a pair of rods fixed in spaced relation to said uprights, carriage means slidingly movable on said rods, first jaw means mounted on said carriage means selectively engageable with the spaced wires to selectively clampingly grip same, and first actuator means associated with one of said uprights and operable to cause reciprocating movement of said carriage means in one direction when said first jaw means is clampingly engaged with said wires and movement in the reverse direction when said first jaw means is not clampingly engaged to said wires whereby said wires are moved in intermittent fashion.

22. The apparatus set forth in claim 19 wherein said first jaw block means comprises second and third actuator means mounted on said carriage means, second and third extension means associated with said second and third actuator means, first and second jaw members mounted respectively on said second and third extension members in opposed relation to each other, third and fourth jaw members biased apart by first biasing means and respectively disposed in opposed relationship to said first and second jaw members, adjustable stop means mounted on said carriage base and operable to define the limit of movement of said third and fourth jaw members under said first biasing means, said pair of wires being adapted to be respectively disposed between said first and third jaw members and said second and fourth jaw members whereby actuation of said second and third actuator means causes engagement of said jaw members with said pair of wires.

23. In an assembly machine, means at a station for presenting a plurality of conductors in a first spaced substantially parallel position, means at said station for periodically positioning a workpiece blank having plastic and metallic portions intermediate said conductors while in said first posittion, means for changing the spaced relationship of said conductors to a second position in engagement with said plastic portions of the blank in timed relationship to the periodic positioning of the blanks, and means for permanently uniting said plastic portions of the blank and said conductors subsequent to movement of the conductors to their said second position.

References Cited in the file of this patent

UNITED STATES PATENTS

| 1,740,177 | Horton et al. | Dec. 17, 1929 |
| 2,419,484 | Danziger | Apr. 22, 1947 |
| 2,531,389 | Brandt | Nov. 28, 1950 |
| 3,021,589 | Weller | Feb. 20, 1962 |
| 3,040,415 | Rayburn | June 26, 1962 |

FOREIGN PATENTS

| 875,219 | Great Britain | Aug. 16, 1961 |